US006285462B1

(12) United States Patent
Balasubramanian et al.

(10) Patent No.: US 6,285,462 B1
(45) Date of Patent: Sep. 4, 2001

(54) INTELLIGENT GCR/UCR PROCESS TO REDUCE MULTIPLE COLORANT MOIRE IN COLOR PRINTING

(75) Inventors: Thyagarajan Balasubramanian; Reiner Eschbach, both of Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/192,106

(22) Filed: Nov. 13, 1998

(51) Int. Cl.$^7$ .................................................. H04N 1/40
(52) U.S. Cl. ................................................ 358/1.9; 358/533
(58) Field of Search ........................... 358/1.9, 533, 454, 358/534–536; 382/237, 269

(56) References Cited

U.S. PATENT DOCUMENTS

| 2,790,844 | 4/1957 | Neugebauer | 178/5.2 |
|---|---|---|---|
| 4,149,194 | 4/1979 | Holladay | 358/283 |
| 4,275,413 | 6/1981 | Sakamoto et al. | 358/80 |
| 4,500,919 | 2/1985 | Schreiber | 358/78 |
| 5,168,552 | 12/1992 | Vaughn et al. | 315/109 |
| 5,296,923 | 3/1994 | Hung | 358/527 |
| 5,305,119 | 4/1994 | Rolleston et al. | 358/522 |
| 5,394,252 | 2/1995 | Holladay et al. | 358/533 |
| 5,402,245 | 3/1995 | Motta et al. | 258/298 |
| 5,572,600 | * 11/1996 | Tajima et al. | 382/163 |
| 5,655,061 | 8/1997 | Tse et al. | 395/102 |
| 5,659,634 | 8/1997 | Yeh et al. | 382/232 |
| 5,734,800 | * 3/1998 | Herbert et al. | 358/1.9 |
| 5,740,334 | * 4/1998 | Lin et al. | 358/1.9 |
| 5,786,900 | * 7/1998 | Sawano | 358/298 |

OTHER PUBLICATIONS

Po–Chieh Hung, "Tetrahedral Division Technique Applied to Colorimetric Calibration for Imaging Media", Annual Meeting IS&T, N.J., May, 1992, pp. 419–422.

Po–Chieh Hung, "Colorimetric Calibration for Scanners and Media", SPIE, vol. 1448, Camera and Input Scanner System, (1991).

Sigfredo I. Nin, et al., "Printing CIELAB Images on a CMYK Printer Using Tri–Linear Interpolation", SPIE Proceedings, vol. 1670, 1992, pp. 316–324.

SPIE Proceedings, vol. 1670, 1992, pp. 316–324; William J. Gordon et al., "Shepard's Method of Metric Interpolation'to Bivariate and Multivariate Interpolation", Mathematics of Computation, vol. 32, No. 141, Jan. 1978, pp. 253–264.

P. Lancaster et al., "Surfaces Generated by Moving Least Squares Methods", Mathematics of Computation, vol. 32, No. 155, Jul. 1981, pp. 141–158.

Pekka Laihanen, "Colour Reproduction Theory Based on the Principles of Colour Science", Advances in Printing Science and Technology, W. H. Banks ed., Pentech Press, London, 1988, pp. 1–36.

Pekka Laihanen, "Optimization of Digital Color Reproduction on the Basis of Visual Assessment of Reproduced Images", Proceedings of the SID, vol. 30, No. 3, 1989, pp. 183–190.

Donald Shepard, "A two–dimensional interpolation function for irregularly spaced data," Proceedings–1968 ACM National Conference, pp. 517–524.

R. Balasubramanian and R Eschbach: "Design of UCR and GCR Stategies to Reduce Moiré in Color Printing", PICS 1999, vol. 2, Apr. 1999 m pp. 390–393.

* cited by examiner

*Primary Examiner*—Thomas D. Lee
*Assistant Examiner*—Stephen Brinich
(74) *Attorney, Agent, or Firm*—Mark Costello; Mark Z. Dudley

(57) ABSTRACT

A processing system for preparing a plural separation document image for printing, including a process for mitigation or reduction of three color moiré. An approximation of moiré amplitude is calculated, and compared to a reference. Where three color moiré mitigation is desirable, black is removed and replaced with other separation colors.

20 Claims, 6 Drawing Sheets

INTELLIGENT GCR/UCR PROCESS TO REDUCE MULTIPLE COLORANT MOIRE IN COLOR PRINTING

This invention relates to the use of gray component replacement and under color removal as a process for the reduction of moiré.

BACKGROUND OF THE INVENTION

Color in documents is the result of a combination of a limited set of colorants over a small area, in amounts selected to integrate to a desired color response. This is accomplished in many printing devices by reproducing separations of the image, where each separation provides varying amounts of a single primary colorant. When combined together with other separations, the result is a full color image.

For color images, a plurality of color separations are combined. Each color separation corresponds to a single colorant, and may be defined by a number of gray levels in excess of the capability of the printer. In such cases, each of the color separations is reduced from the input number of levels to the smaller output number of levels reproducible by the printer. The multiple color separations are combined together at printing to yield the final color print. Commonly, color documents are formed using cyan, magenta and yellow colorants or cyan, magenta, yellow and black colorants. A larger number or alternative colorants may also be used.

In printing documents, the desired gray level over an area is commonly achieved by halftoning, where image gray level variation is represented by placing greater or lesser numbers of ON pixels in a discrete area of the image. In one halftoning method, known as dithering or screening, over a given area having a number of gray separation pixels therein, a value representing the gray level of each separation pixel of an array of gray separation pixels within the area is compared to one of a set of preselected thresholds (the thresholds are stored as a dither matrix and the repetitive pattern generated by this matrix is considered a halftone cell) as taught, for example, in U.S. Pat. No. 4,149,194 to Holladay. For an area where the image is gray, some of the thresholds within the dither matrix will be exceeded, i.e., the image value at that specific location is larger than the value stored in the dither matrix for that same location, while others are not. In the binary case, the image pixels or cell elements for which the thresholds are exceeded might be printed as a maximum colorant value, while the remaining separation pixels are allowed to remain white, dependent on the actual physical quantity described by the data. The described halftoning method produces an output pattern that is periodic or quasi-periodic in the spatial coordinates.

Halftoning creates problems in color document reproduction where the repeating pattern of a screen through the image, when superposed over similar repeating patterns in multiple separations, can cause moiré or other artifacts, particularly in printing systems with less than ideal registration between separations.

The artifacts caused by misregistration can be understood from simple examples. Assume for simplicity two separations having halftone screens with identical screen frequencies and angles. Printing those two separations on top one another in perfect registration will give a homogeneous color without periodic artifacts. If the second screen is spatially shifted with respect to the first screen, a strong shift in the output color will occur. Printing systems that are likely to have such a spatial displacement between the separations due to physical limitations are prone to color shift artifacts in the final prints.

A different type of artifact occurs if the printing system is likely to have a slight rotation between separations. In these instances, a color moiré is formed, spatially progressing from one color to another. In another example, assume again for simplicity two separations having halftone screens having identical screen frequencies but different angles. Printing those two separations on top of one another in perfect registration will give a homogeneous color and, depending on the angle between the two separations, a high or low frequency moiré. In situations where the angle is large (e.g.: 30°) a high frequency moiré occurs which is usually not to distracting, and in cases where the angle is small (e.g.: 2°) a low frequency moiré occurs which is usually distracting. If these two separations are printed shifted with respect to one another, no color shift is perceived in constant color areas, and no change in the moiré frequency occurs. A halftone screen scheme using different angles for the different color separations is therefore less sensitive to a spatial displacement than a scheme using identical angles for all separations. If the two separations are printed with a change in the angle between the separations, the frequency and direction of the moiré is altered and a non-objectionable moiré might be changed to an objectionable moiré.

There are always 2-way moiré patterns between the color separations, but the angles are chosen to maximize the frequency of the moirés (they are about ½ the screen frequency). These are the "rosettes" noted in magnified color halftones. This is true of both analog (photographic) and digital systems and is not a significant quality problem. Whenever a fourth color (black or "key") is included, there is another moiré pattern, formed by a 3-way interaction between cyan, magenta and black. In analog systems, this moiré is preferably positioned at zero frequency. In digital systems which use halftoning processes such as the Holladay rational angle screens, or the like, angles of exactly 15 degrees are not possible, so the 3-way moiré is not quite at zero frequency. It should be noted that in systems using more than 4 colorants the equivalent argument holds for the dominant colorants of that system.

The color halftoning scheme using different angles for some or all of the color separations is common for applications that have slight misregistrations due to physical limitations. Accordingly, and with reference again to U.S. Pat. No. 4,149,194 to Holladay, the angle of the screen can be changed to generate similar screen patterns which do not strongly beat visually against each other, with the result the objectionable moiré is reduced. Particularly critical are the angles between the most prominent colors, particularly cyan, magenta and black (if present). A common arrangement of rotated screen angles is 0°, 15°, 45° and 75° for yellow, cyan, black and magenta, respectively, in which case all separations are commonly halftoned using the same screen frequency, sometimes with the exception of yellow. However, objectionable patternings still occur. In general it can be said that periodic halftone schemes suffer from a combination of color moiré and color shifts on misregistration, dependent on the actual scheme frequency, but is usually at a very objectionable low frequency.

An alternate method exists to suppress the 3-color moiré described above. In this method, described in U.S. Pat. No. 5,394,252 to Holladay et al., one of the dominant colorant separations is replaced with a non-periodic or quasi-non-periodic screen, eliminating the 3-color moiré.

It is important to note for the subsequent discussions that the input color (requested document color) is generally described as a 3 parameter quantity, e.g.: Xerox R,G,B as specified in the Xerox Color Encoding Standard, tristimulus values X,Y,Z, L*a*b*, scanner R,G,B etc. In the printing industry, rendering of a 3-separation image with more than 3 colorants, e.g. cyan (c), magenta (m), yellow (y), black (k), is achieved via a process of undercolor removal (UCR) and gray component replacement (GCR). This process, while most widely used for CMYK printing, can be generalized for an arbitrary choice and number (greater than 3) of colorants. Representing 3 input parameter quantities with e.g.: 4 output parameters, leaves one additional degree of freedom in selecting the 4 parameters. This patent describes a method to optimize the UCR/GCR process, and exploit the extra degree of freedom, to minimize moiré.

It should be noted that the moiré is caused by the unwanted absorption of the printing materials. With "perfect" inks, none of the described two or three color moirés would occur with the exception of the moirés formed through the k (black) separation. Looking at moiré more closely, as noted above, two basic types of color moiré influence print quality. The first type is the 2 color moiré commonly found between yellow and cyan or yellow and magenta, etc. The second, normally more disturbing, moiré is caused by the superposition of cyan, magenta, and black, or, in the case of more than 4 colorants, by the three dominant colorants present. For simplicity of the description and not for limiting the method, we will use the c,m,k case in the following. One interesting aspect of the moiré is that it is not only a function of the spectral absorptance of the colorants, but also a rather direct function of the area coverage of any halftone dot used in reproduction of the image. To explain this, a simple 1-dimensional example can be used.

Assume the superposition of three transparencies, $T_c$, $T_m$ and $T_k$. The output is $T=T_c \cdot T_m \cdot T_k$. Knowing that each transparency has the form of a halftone dot, i.e.: is a binary periodic function, it is noted that $$T_i(x, \lambda) \, a_i(\lambda) T_i(x) \, a_i(\lambda)[\Sigma_n b_{i,n} \cos(2\pi f_i x)] \quad (1)$$

Where
- $a_i(\lambda)$ is the spectral absorbance of the i-th separation;
- $T_i(x)$ is the periodic screen pattern as a function of spatial location x;
- $b_{i,n}$ the n-th Fourier coefficients of the halftone screen of separation i; and
- $f_i$ is the frequency of the halftone screen of separation i;

Disregarding everything higher than first order, the equation can be simplified to:

$$T \, a_c(\lambda) a_m(\lambda) a_k(\lambda) [b_{c,0} + b_{c,1} \cos(2\pi f_c x)][b_{m,0} + b_{m,1} \cos(2\pi f_m x)][b_{k,0} + b_{k,1} \cos(2\pi f_k x)] \quad (2)$$

Equations (1) and (2) make it clear that if the individual transmittances would have no unwanted absorbtions, i.e.: $a_i(\lambda) \cdot a_j(\lambda)=0$, no moiré would occur. Of all the cross-terms of Equation (2), only the term covering the three periodic components is involved in the 3-color moiré. This moiré component M can be written as $$M \, b_{c,1} b_{m,1} b_{k,1} \cos(2\pi f_c x) \cos(2\pi f_m x) \cos(2\pi f_k x) \quad (3)$$

It is the regard for this moiré component that will guide the GCR/UCR method described in this patent. The effect of this approach is that the degree(s) of freedom derived by representing a 3 parameter color quantity with more than 3 parameters will be used to fulfill boundary conditions totally or partially derived from the above mentioned moiré considerations.

In contrast, conventional GCR/UCR strategies are a function of the minimum component of the requested color and potentially the overall lightness of the color. Commonly this means that while GCR/UCR is performed for darker colors, the UCR is set to zero for light colors, and colors with high chroma.

All of the references cited herein are incorporated by reference for their teachings.

SUMMARY OF THE INVENTION

In accordance with the invention, there is provided a method of reducing three color moiré by controlling UCR and GCR to limit moiré-causing interference between separations.

In accordance with one aspect of the invention, there is provided a processing system for preparing a document image for print calibration or printing, said document image to be described by image signals in plural separations including black, and controlling application of black addition thereto to mitigate three color moiré. The process includes: receiving the image signals in plural separations; calculating an approximation of moiré amplitude from the received image signals comparing moiré amplitude with at least one reference value; for locations where moiré amplitude unfavorably compares with said reference value, changing the GCR/UCR settings so that the colorimetric same color is reproduced with a different combination of c,m,y,k values exhibiting a different and preferably minimized moiré amplitude.

In accordance with another aspect of the invention, moiré amplitude approximation is calculated in accordance with the function:

$$M(I_c, I_m, I_k) = \frac{2}{\pi} \sin(\pi \sqrt{I_c}) \cdot \frac{2}{\pi} \sin(\pi \sqrt{I_m}) \cdot \frac{2}{\pi} \sin(\pi \sqrt{I_k(I_c, I_m, I_y)}).$$

where
- $M(I_n)$ is moiré amplitude for the superposition of separations $I_n$;
- c, m, y and k, respectively denote reference to cyan, magenta, yellow and black or key separations;
- $I_n$ is the gray level input to the halftoner corresponding to separation n and
- $I_k(I_c, I_m, I_y)$ indicates that the k-separation is determined as a function of the other separations.

Note in the above description that generally $I_k$ is completely determined as soon as the separations c,m,y are pre-determined, but that different c,m,y,k separations can lead to the identical colorimetrically described color.

In accordance with still another aspect of the invention, the invention finds particularly advantageous use in a color-characterized printing system including black addition and undercolor removal, and for which a device characterization process generates a characterization table relating device independent colors to device dependent colors The characterization process includes a method of mitigating three color moiré, including: receiving and printing a set of characterization image signals in plural separations including black after black addition and undercolor removal; determining the presence of undesirable three color moiré in said printed calibration image signals; generating a moiré mitigation strategy, modifying the cyan, magenta, yellow, and black pixel values according to this strategy; and storing said strategy as part of a calibration table generated for said calibrated printing systems.

It can be seen from Equation (3) that we derive a color correction scheme that reduces the three component moiré. Equation (3) is strongly influenced by the UCR/GCR (under color removal/gray component replacement) strategies that are employed. Here, it is to be noted that the k-component component of many images, and consequently $b_{k,n}$, is usually generated "artificially" by color correction software as part of a black addition scheme to improve the aesthetic appearance of the image. Several distinct (c,m,y,k) quadruplets would result in identical colors. One trivial way to eliminate three component moiré would be to eliminate k, thereby setting $b_{k,n}$ to zero. This is equivalent to reproducing the image with a standard three color process. However, this method is undesirable since the color gamut of normal three color systems is far more restricted than the color gamut of 4 color systems.

Examining Equation (3), one can find another option for reducing the moiré: the Fourier coefficients $b_{i,n}$ are a function of the opening ratio, i.e.: the ratio of pixels in the ON state to pixels in the OFF state, of the halftone dot and consequently of the input level to the halftoning process. The Fourier coefficients for n>0 can be written as:

$$b_{i,n} = \frac{4}{P}\int_0^{\frac{P}{2}} T_i(x)\cos\left(\frac{2n\pi x}{P}\right)dx \qquad (4)$$
$$= \frac{4}{P}\int_0^{\frac{l_i P}{2}} \cos\left(\frac{2n\pi x}{P}\right)dx$$
$$= \frac{2}{n\pi}\sin(n\pi l_i).$$

Here we use a normalized input $0 \leq l \leq 1$ and an area coverage of the halftone dot of $0 \leq lP \leq P$.

Note that Equation (4) describes the Fourier coefficients for an ideal, binary halftone. Any deviation from that ideal model can be easily included in the calculation by using the appropriate Fourier coefficients for the real transmittances.

The moiré amplitude M is therefore directly dependent on the triplet ($I_c$, $I_m$, $I_k$) of gray level inputs to the halftoner. This triplet is derived from the original input color using the GCR/UCR scheme (with no black being used, we have $I_k$=0). From Equation (4) it is clear that in the one-dimensional case $b_{i,1}$ is maximum for $I_i$=½. Equation (3), therefore the estimated moiré amplitude is maximum if all three components ($I_c$, $I_m$, $I_k$) equal ½.

From Equation (4), it is clear that the output moiré is a function of the UCR/GCR scheme. Assume an input color triplet (R, G, B ). This color can be represented in the output by a quadruplet of the form ($I_c$, $I_m$, $I_y$, $I_k(I_c, I_m, I_y)$) that is underdefined. Note that the K element of the quadruplet is a function of the C M and Y components of the image. Only the GCR/UCR scheme defines the one quadruplet to be used. Once again taking into account only the first order harmonics, that quadruplet will have a 3-color moiré amplitude of:

$$M(I_c, I_m, I_k) = \frac{2}{\pi}\sin(\pi I_c) \cdot \frac{2}{\pi}\sin(\pi I_m) \cdot \qquad (5)$$
$$\frac{2}{\pi}\sin(\pi I_k(I_c, I_m, I_y))$$

Recall that Equation (5) only describes the one-dimensional case. A simple extension to two dimensions can be made as shown in Equation (6):

$$M(I_c, I_m, I_k) = \frac{2}{\pi}\sin(\pi\sqrt{I_c}) \cdot \frac{2}{\pi}\sin(\pi\sqrt{I_m}) \cdot \qquad (6)$$
$$\frac{2}{\pi}\sin(\pi\sqrt{I_k(I_c, I_m, I_y)}).$$

Keeping in mind that this extension is only a first order approximation of the real moiré amplitude, since the two-dimensional Fourier coefficient will have a different form of the generalized one-dimensional coefficient. The approximation used has been successfully applied in other areas of image processing, e.g., image binarization using a pulse-density modulation. It has been empirically shown to be a good first order approximation.

A contour plot of $M(I_c, I_m, I_k)$ is shown in FIG. 1 as a function of $I_c$ and $I_k$, with $I_m$=0.4. The function has a maximum value of 0.258 at $I_c$=$I_m$=$I_k$=¼, and vanishes at the boundaries (i.e. when at least one of $I_c$, $I_m$, $I_k$ is 0 or 1). This model suggests that one should stay away from CMK combinations in the vicinity of $I_c$=$I_m$=$I_k$=¼.

Other functions that come after UCR/GCR and before the halftoner, such as linearization TRCs, will also affect the values ($I_c$, $I_m$, $I_k$), although usually in a simple monotonic fashion. These functions must be taken into account in a suitable manner when deriving the model for moiré (6).

These and other aspects of the invention will become apparent from the following descriptions used to illustrate a preferred embodiment of the invention read in conjunction with the accompanying drawings in which.

Figure 3:
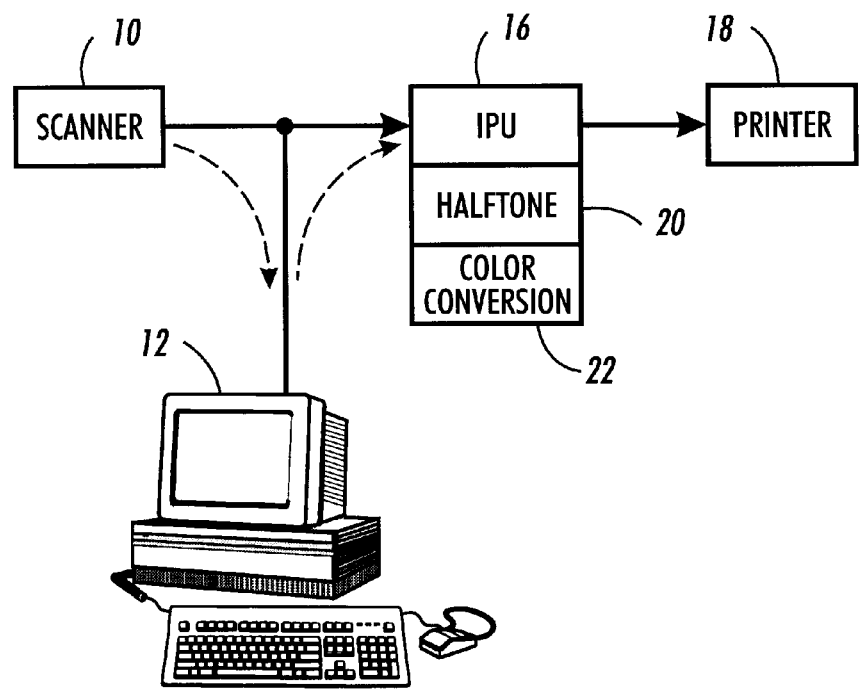
FIG. 3 is a simplified description of a system in which the present invention may find advantageous use.

Referring now to the drawings where the showings are for the purpose of describing an embodiment of the invention and not for limiting same, a basic image processing system is shown in FIG. 3. In the present case, gray image data may be characterized as image signals or pixels, each being defined at a single gray level or reflectance or the like in a set of 'c' gray levels, the number of members in the set of levels being larger than desired. Each pixel will be processed in the manner described herein below, to redefine each pixel in terms of a new, smaller set of 'd' levels. In this process, 'c' and 'd' are integer values representing pixel depth, or a number of signal levels at which the pixel may appear. One common case of this method includes the conversion of data from a relatively large set of gray levels to one of two legal or allowed binary levels for printing in a binary printer. If standard multiple separation screening or dithering processes are used, the image will thereafter have a frequency, and angle associated with it.

As used herein, a "pixel" refers to an image signal associated with a particular position in an image, having a gray level between a minimum and a maximum. Accordingly, pixels are defined by gray level and position. "Gray", as used herein does not refer to a color unless specifically identified as such. Rather, the term refers to image signals that vary between maximum and minimum, irrespective of the color of the separation in which the signals are used.

In a color system, color documents are represented by multiple sets of image signals (bitmaps), each set (or separation) represented by an independent channel, which is usually processed independently. A "color image" is therefore a document including at least two separations, such as in the Xerox 4850 Highlight Color Printer and commonly three or four separations, such as in the Xerox 4900 Color Laser or sometimes more than four separations. One possible digital copier (a scanner/printer combination) is described for example, U.S. Pat. No. 5,655,061 or U.S. Pat. No. 5,659,634 incorporated herein by reference.

Each document provides a set of image signals or pixels that will drive a printer to produce an image. In the case of multicolor printers, the separations, superposed together, form the color image. In this context, we will describe color pixels as the combination of pixels which represent gray levels of each separation of the document image in a given small area thereof.

With reference now to FIG. 3, which shows a general system requirement representing the goal of the invention, a document system derives an electronic representation of a document being either a calibration document or a customer document (hereinafter, an image) from image input terminal such as scanner 10, in a format related to the physical characteristics of the device, and commonly with pixels defined at m bits per pixel. Common scanners, such, for example, produce 8 bit/pixel data, at resolutions acceptable for many purposes. If this is a color document, the image is defined with two or more separation bitmaps, usually with identical resolution and pixel depth. Data from scanner 10 may be directed on for processing directly, or to an appropriately programmed general purpose computer 12, or the like. Alternatively, the source of image data may be the appropriately programmed general purpose computer. The electronic image signals are directed through an image processing unit (IPU) 16 to be processed so that an image suitable for reproduction on image output terminal or printer 18 is obtained. Image processing unit 16 commonly includes a color conversion unit 22 which converts the 3 component color description to the printer specific 4 or more component color description, and a halftoner 20 which converts a c bit digital image signals to d bit digital image signals, suitable for driving a particular printer, where c and d are integer values. IPU 16 may be part of the printer, or part of a general purpose computer. It may include special purpose hardware, or merely represent appropriate programs running on the general purpose computer. It may also represent special purpose programs running on a remote computer.

Processes for color conversion from 3 to 4 components are well known, as exemplified by the following incorporated by reference, including U.S. Pat. No. 4,500,919 to Schreiber, for teachings of a color conversion system converting information from RGB to CMYK; U.S. Pat. No. 4,275,413 to Sakamoto for its teachings of tetrahedral interpolation between first and second color spaces; U.S. Pat. No. 2,790,844 to Neugebauer disclosing the desirability of defining an image in a first standard color space prior to conversion of the image coordinates to a second printer based coordinate system, and U.S. Pat. No. 5,296,923 to Hung; and U.S. Pat. No. 5,305,119 to Rolleston et al., which provides a discussion of a calibration systems in a color printing systems with a look up table. The following articles are also hereby incorporated by reference: Po-Chieh Hung, "Tetrahedral Division Technique Applied to Colorimetric Calibration for Imaging Media", Annual Meeting IS&T, N.J., May, 1992, pp. 419–422; Po-Chieh Hung, "Colorimetric Calibration for Scanners and Media", SPIE, Vol. 1448, Camera and Input Scanner System, (1991); Sigfredo I. Nin, et al., "Printing CIELAB Images on a CMYK Printer Using Tri-Linear Interpolation", SPIE Proceedings, Vol. 1670, 1992, pp. 316–324; William J. Gordon et al., "Shepard's Method of 'Metric Interpolation' to Bivariate and Multivariate Interpolation", Mathematics of Computation, Vol. 32, No. 141, January 1978, pp. 253–264; P. Lancaster et al., "Surfaces Generated by Moving Least Squares Methods", Mathematics of Computation, Vol. 32, No. 155, July 1981, pp. 141–158; Pekka Laihanen, "Colour Reproduction Theory Based on the Principles of Colour Science", Advances in Printing Science and Technology, W. H. Banks ed., Pentech Press, London, 1988, pp. 1–36; Pekka Laihanen, "Optimization of Digital Color Reproduction on the Basis of Visual Assessment of Reproduced Images", Proceedings of the SID, Vol 30. No. 3, 1989, pp. 183–190; and Donald Shepard, "A two-dimensional interpolation function for irregularly spaced data," Proceedings-1968 ACM National Conference, pp. 517–524. Fundamentally, any calibrated color printer will have a process for conversion of color images from device independent space to device dependent space.

Examining Equation (6) above it becomes clear, for example, that the UCR/GCR function in the red area of color space should be different from the UCR/GCR function used in the blue area of color space for the same luminance component and same minimum value of c, m, y. Equation (6) can be used to restrict the GCR/UCR scheme in the blue area (c and m are present) to those schemes that have a small moiré value. In the red area, CMK moiré limitation disappears. GCR/UCR schemes that do not take this into account run the risk of introducing a moiré in one area or of using a suboptimal GCR/UCR in another area of color space.

Different strategies can be employed to reduce three component moiré :

1 ) Limiting the Moiré Amplitude

Figure 1:
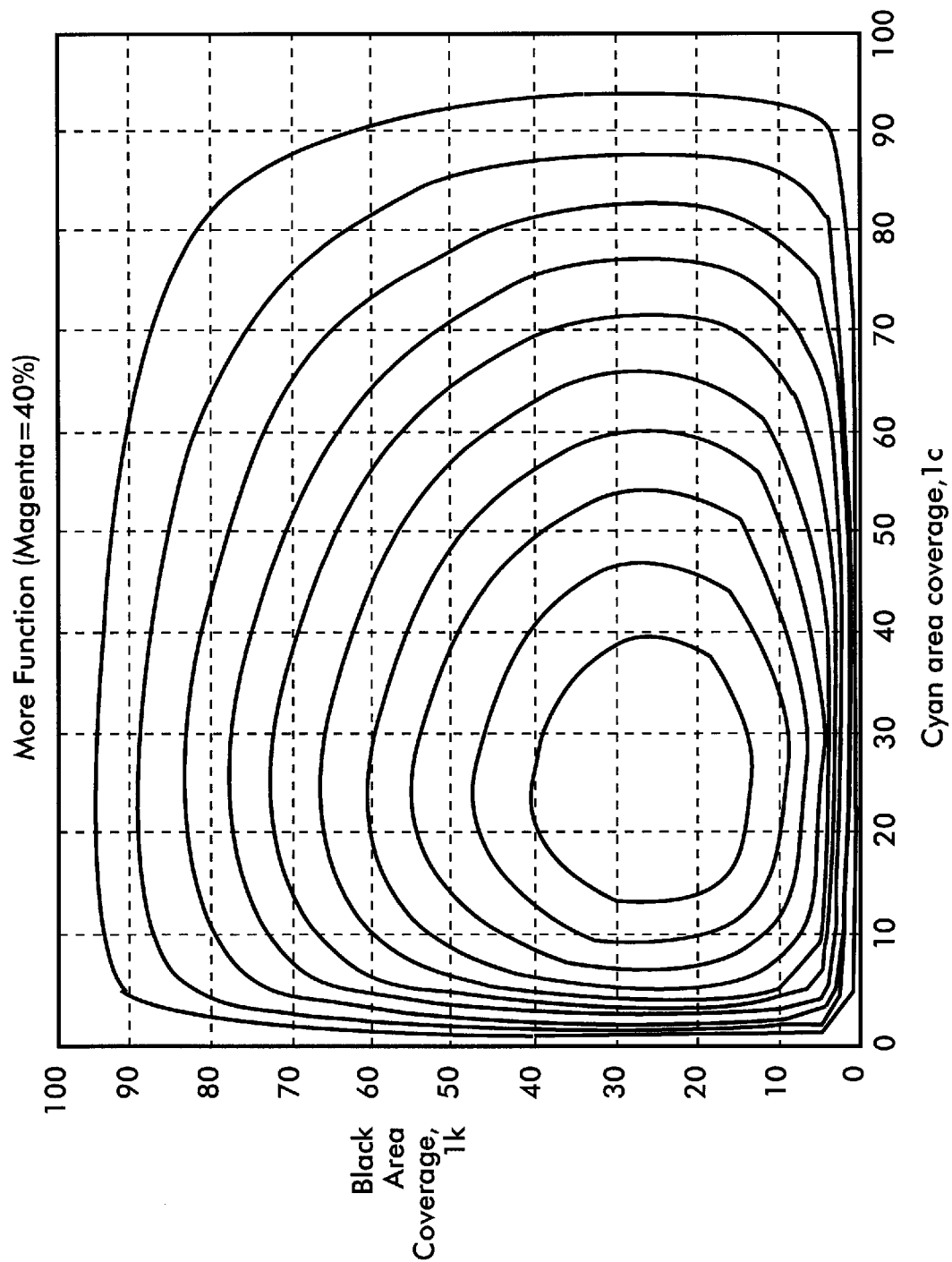
FIG. 1 is a contour plot of the function depicted in Equation 6, above.
Figure 2:
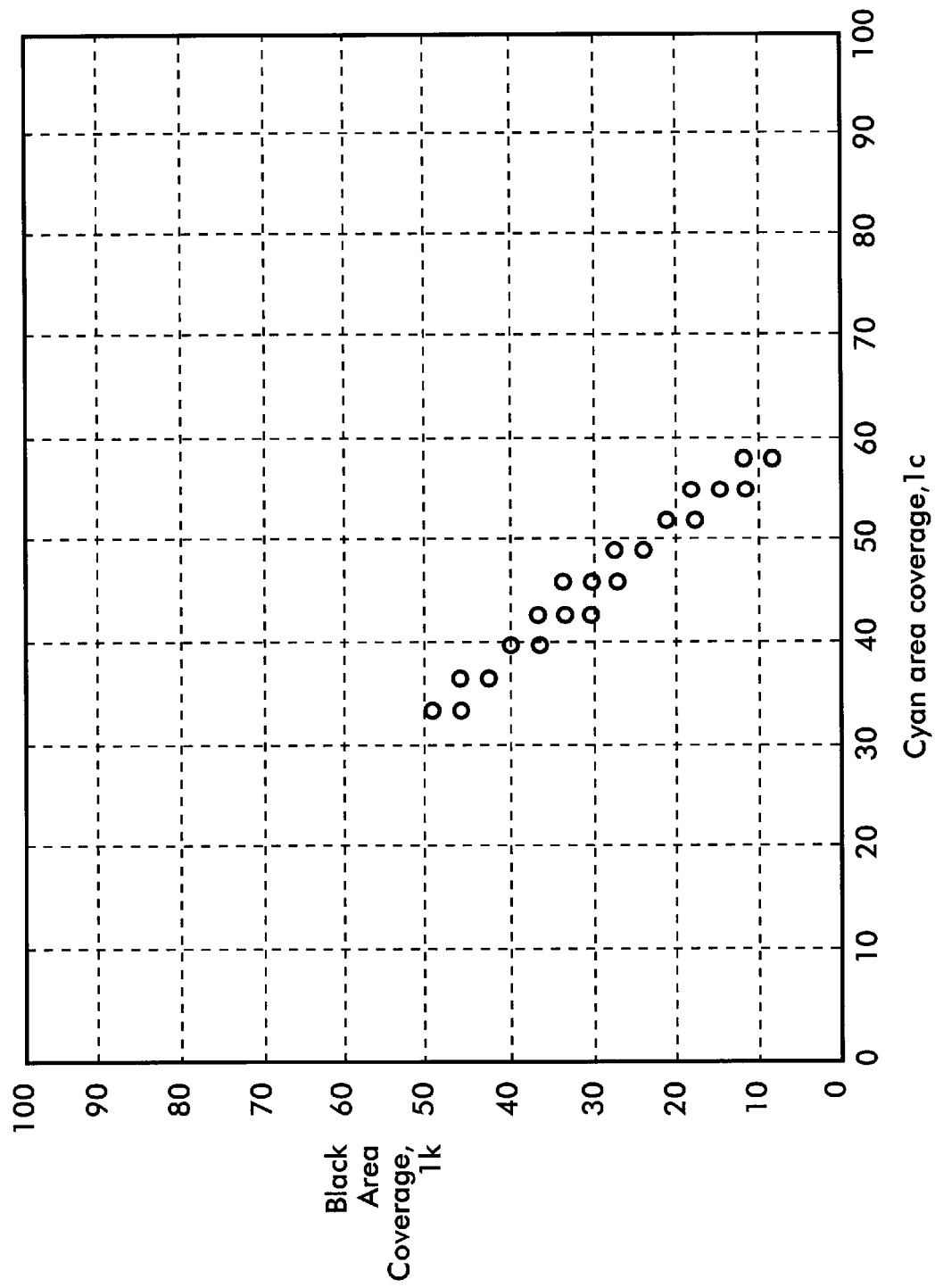
FIG. 2 is a projection onto $I_c$-$I_k$ plane of some combinations ($I_c$,$I_m$,$I_y$,$I_k$) that result in the same printed color.

From Equation (6) it is possible to derive an algorithm that reduces the moiré by limiting the moiré amplitude M. It is initially noted that many different combinations of CMYK can yield approximately the same printed color. Employing a typical color and using a clustered halftone dot, it is possible to derive the information of FIG. 2, which shows a projection onto the 2-dimensional C-K plane of a set of CMYK values which yield very similar L*a*b* values with this printer when measured. A comparison of FIGS. 1 and 2 shows that for a given color, one can pick CMYK combinations that cause different moiré amplitudes. From Equation (6), the moiré amplitudes can be calculated for any particular color. The calculated and observed Moiré amplitudes seem to correlate reasonably well, even though the equation ignores effects beyond the first order. Note that from FIGS. 1 and 2, we can also deduce the direction to perturb the CMYK values that reduces the moiré. For the purpose of color correction, a standard GCR/UCR strategy would be applied in the creation of the color correction tables, but simultaneously for any given CMYK combination, moiré amplitude is computed. As soon as the moiré amplitude exceeds a preset limit, the GCR/UCR method is adjusted to limit the amplitude. The adjustment can be made very simply: the input component with the largest amplitude is examined and changed (this is done by decreasing area coverage for $l<¼$ and increasing area coverage for $l≧¼$) and the change is monitored. The remaining components may be adjusted to compensate for this change, using a predetermined printer characterization function. This approach might take several computations per point in color space, but it is only performed once during the generation of the color profile. Note that linearization TRC's often follow the GCR/UCR module in the image path, and must be taken into account when computing the moiré amplitude from the output of the UCR/GCR step. In fact, it may be more convenient to perform the moiré based adjustments as a CMYK-to-CMYK transformation following the TRC's, rather than in the GCR/UCR step.

Figure 4:
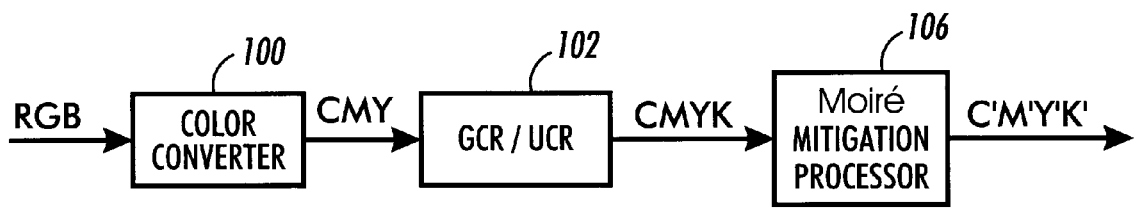
FIG. 4 shows a device which is operative to include the invention.
Figure 5:
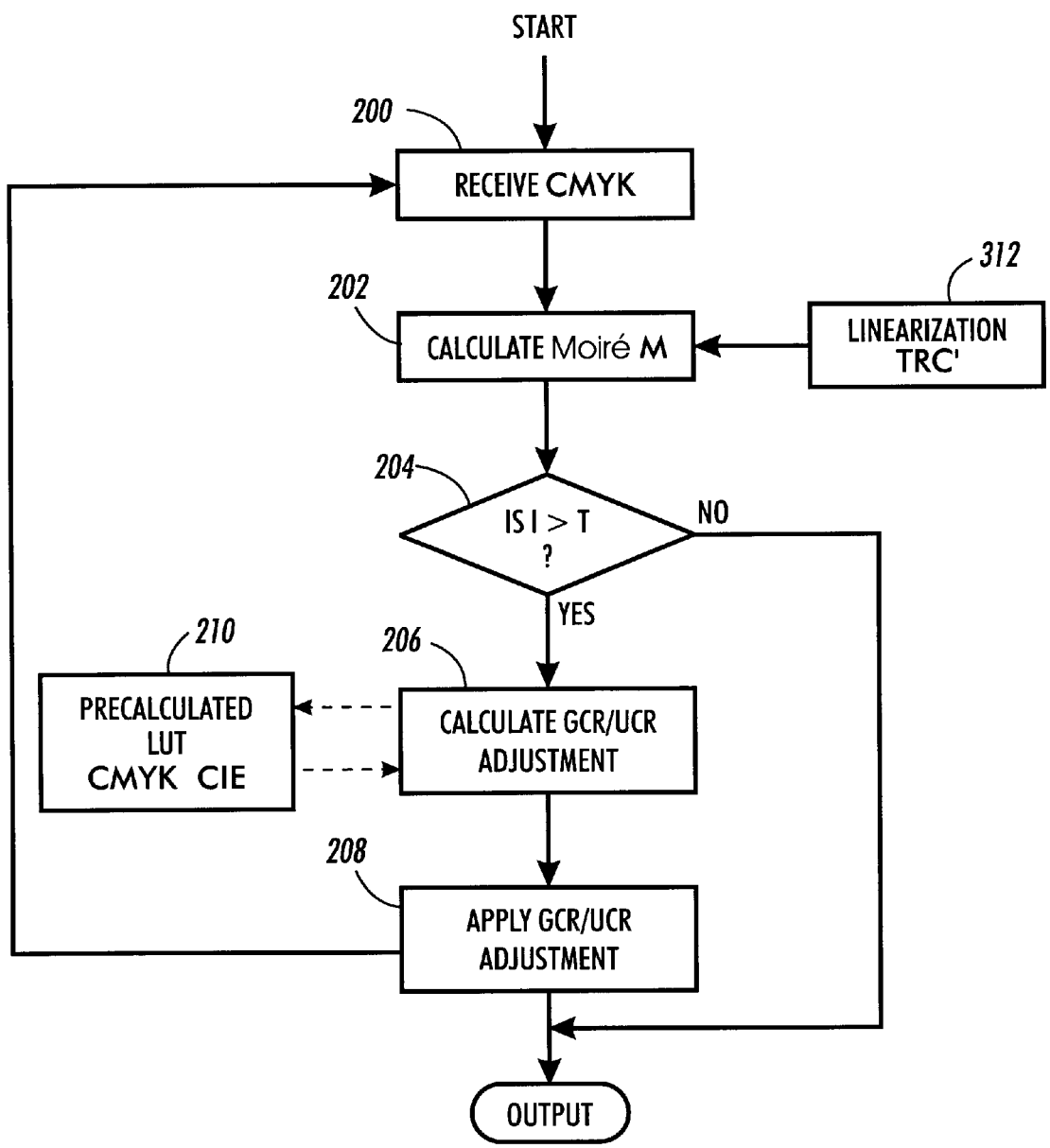
FIG. 5 is a flow chart, describing a process incorporating the present invention.

With reference to FIG. 4, in a typical calibrated printer, incoming RGB signals are converted to CMY signals at a color converter 100. In a more or less standard system, the CMYK signals will be altered, either integrally or independently, based on aesthetics, for black addition and undercolor removal (together GCR/UCR 102). The CMYK signals (CMYK) are directed to a printer. In one possible embodiment, the CMYK signals are also directed to moiré mitigation processor 106 which in turn modifies the CMYK signals to be C'M'Y'K', based on the response of the moiré mitigation processor. In one embodiment, the transformations in FIG. 4 could be used to build a 3-D lookup table that maps the input triplet to final output CMYK. Looking at the moirémitigation process involved in FIG. 5, CMYK signals coming out of the UCR/GCR step are initially received (step 200). From the signals, a value for the moiré amplitude is calculated at step 202. This calculation requires knowledge of all the image processing functions that possibly modify the CMYK values between the UCR/GCR and halftoning steps. Most often, these are linearization TRCs (312), as shown in FIG. 5. The moiré value M is used in the decision 204 determining whether M is greater or less than a threshold value T, which controls the application of moiré mitigation. If M is greater than the threshold value T, then a GCR/UCR reduction or change is calculated (206) so as to achieve the same or similar color, and applied at step 208. In one embodiment, the CMYK adjustment (206) can be accomplished by looking up a table (210) that maps CMYK to CIE color (e.g. L*, a*, b*) to find different CMYK combinations that result in the same printed color II) Limiting the allowable area coverages Another potential embodiment considers only the area coverage of one of the color components—preferably k—and limits area coverage to reduce Moiré. Since the model Equation (6) predicts the highest moiré around ¼ area coverage, the chosen component could be restricted to an area coverage AC<¼−Δ and AC>¼+Δ for the "blue" part of color space, where "blue" can be defined by an approximation to hue, derived from the input CMYK. This limit in one of the components could be compensated for by changing the values of the remaining three components in some reasonable fashion.

Figure 6:
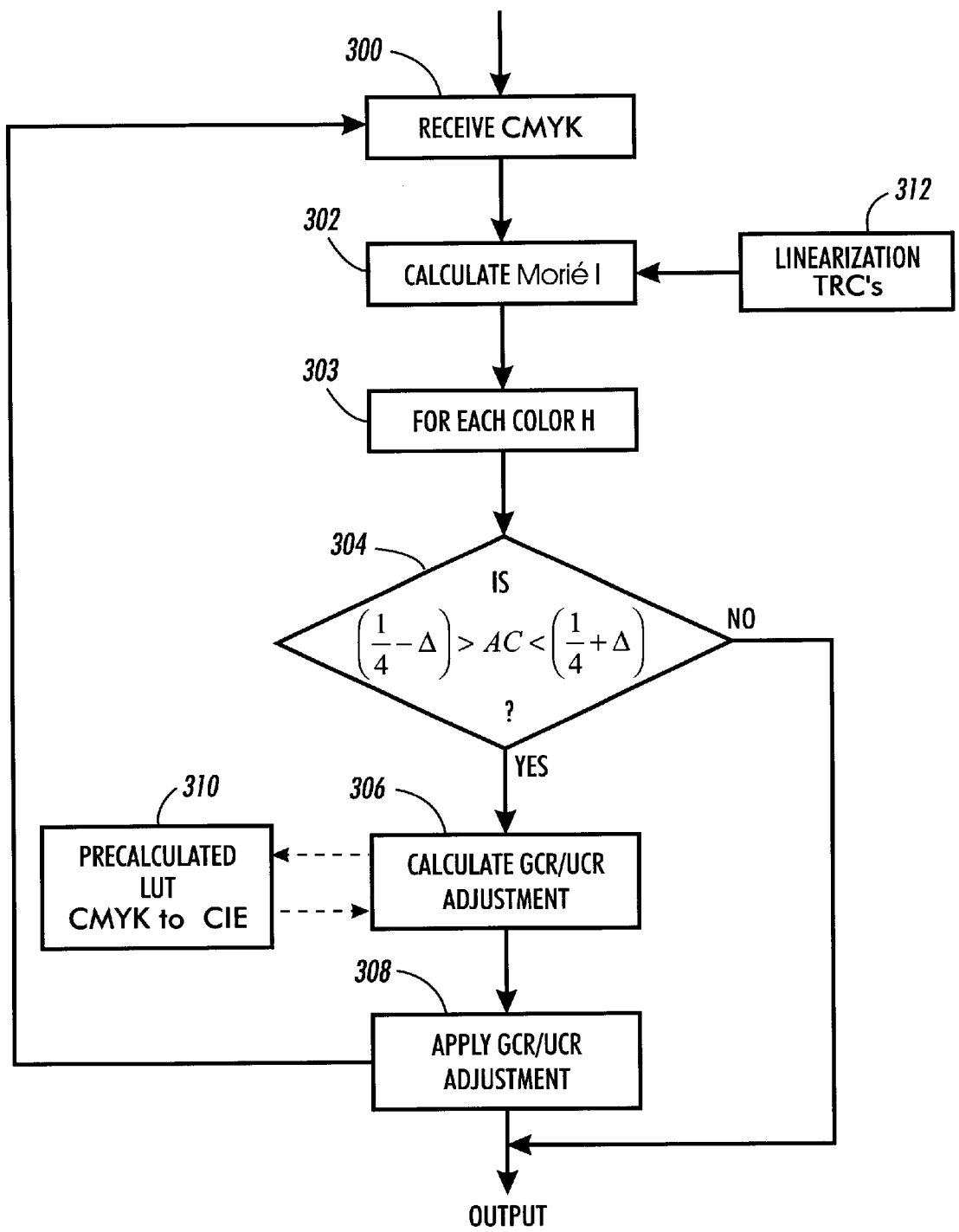
FIG. 6 is another flow chart, describing yet another embodiment of the present invention.

Looking at the process involved in FIG. 6, CMYK signals are initially received (step 300). From the signals, a value for the moiré amplitude M is calculated at step 302. The process takes into account of image processing variations, such as linearization TRC's 312. For each color used (step 303), this value is used in the decision 304 determining whether AC is between values of ¼+Δ and ¼−Δ, which controls the application of moiré. If AC is between the identified values, then a GCR/UCR adjustment is calculated (306), and directed to those function at step 308. Optionally, the adjustment values may be available in a LUT available to the process.

III) Visually based blending of GCR/UCR schemes

A third embodiment begins with a standard GCR/UCR which is optimized with respect to some other criterion like neutral reproduction. Subsequently, patches of constant color in the "blue" area of color space are printed using different UCR/GCR schemes. A visual examination of the patches yields the acceptable moiré amplitude and corresponding GCR/UCR parameters. The final GCR/UCR scheme uses the standard method, adapted to the moiré scheme in a limited hue range of color space. Smooth transitions are done, e.g. by conventional blending techniques.

Figure 7:
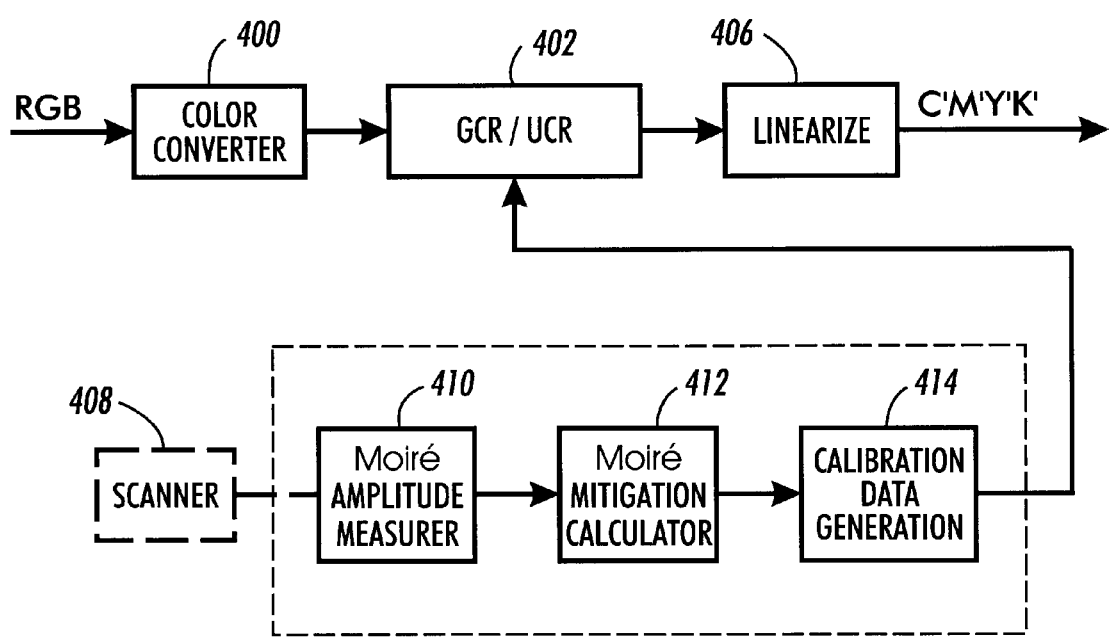
FIG. 7 illustrates yet another device operative to include the present invention.

In one possible embodiment, illustrated in FIG. 7, RGB signals are converted at a color converter 400. After normal processing for K+402, GCR/UCR 402 and gray balance 406 or linearization 406, prints can be made exhibiting undesirable moiré. The prints can be scanned at scanner 408 or visually examined for subsequent measurement of moiré amplitude 410. Based on measurement of moiré amplitude, a moiré mitigation signal is generated at 412. In one embodiment of the invention, the moiré mitigation signal is used to generate new calibration data at 414 and UCR 402, for use in generating C'M'Y'K'.

All of the aforementioned techniques involve altering the CMYK signals to reduce the moiré. It would be preferable that the perturbations are done in such a way as to approximately preserve color. However, it may not be necessary to attempt exact color matching, because derivation of the GCR/UCR is often followed by derivation of a 3-dimensional lookup table, that could compensates for such variations. This lookup table typically maps colorimetric input such as CIE L*a*b* to printer RGB, and can be thought of as an additional refinement of the color correction shown in FIG. 4.

It will also be appreciated that the described method can be combined with systems employing other colorants or more than 4 colorants. In this case one can either consider the major colorants for a 3-color moiré, or alternatively extend Equation (2) to more colorants, maintaining all subsequent transformations in a corresponding form.

It will no doubt be appreciated that the present invention may be accomplished with either software, hardware or combination software-hardware implementations.

The invention has been described with reference to a particular embodiment. Modifications and alterations will occur to others upon reading and understanding this specification. It is intended that all such modifications and alterations are included insofar as they come within the scope of the appended claims or equivalents thereof.

What is claimed is:

1. A processing system for preparing a document image for printing, said document image to be described by image signals in plural separations including black, and controlling application of black addition thereto to mitigate three color moiré, including:

receiving the image signals in plural separations;

calculating an approximation of moiré amplitude from the received image signals;

comparing moiré amplitude with at least one reference value;

for location where moiré amplitude unfavorably compares with said reference value, controlling black addition to said plural separations and the image signals in said plural separations to limit three color moiré.

2. The processing system as described in claim 1, wherein said plural separations include cyan, magenta and yellow separations.

3. The processing system as described in claim 1, wherein said moiré amplitude approximation is calculated in accordance with the function:

$$M(I_c, I_m, I_k) = \frac{2}{\pi}\sin(\pi\sqrt{I_c}) \cdot \frac{2}{\pi}\sin(\pi\sqrt{I_m}) \cdot \frac{2}{\pi}\sin(\pi\sqrt{I_k(I_c, I_m, I_y)})$$

where
  M($I_n$) is moiré amplitude for the superposition of input amplitudes $I_n$; and
  C, m, y and k, respectively denote reference to cyan, magenta, yellow and black or key separations.

4. The processing system as described in claim 1, wherein said moiré amplitude is compared to a reference value selected to be less than the moiré amplitude maximum value.

5. The processing system as described in claim 4, wherein said moiré amplitude maximum value occurs when $I_c=I_m=I_k=¼$, $I_n$ is the input amplitude corresponding to separation n and c, m, y, and k, respectively, denote reference to cyan, magenta, yellow, and black or key separation.

6. The processing system as described in claim 4, where an area coverage AC is restricted to lie outside the range of Δ about the value of about ¼.

7. The processing systems as described in claim 6, where the input amplitude range Δ about the value that results in maximum moiré amplitude represents a visible range of moiré.

8. The processing system as described in claim 1, wherein black image signals are replaced by images signals representing other color separations.

9. In a calibrated printing system including black addition and undercolor removal, preparing a document image for printing, said document image to be described by image signals in plural color separations and a black separation, and varying the images signals to control three color moiré, including:
  receiving the image signals in plural separations including black;
  calculating an approximation of moiré amplitude from the received image signals;
  comparing moiré amplitude with at least one reference value;
  for location where said comparing indicates an undesired image moiré artifact, adjusting a color pixel defined by said plural separations to limit three color moiré.

10. The method as described in claim 9, wherein said plural separations include cyan, magenta, yellow, and black separations.

11. The method as described in claim 9, wherein said moiré amplitude approximation is calculated in accordance with the function:

$$M(I_c, I_m, I_k) = \frac{2}{\pi}\sin(\pi\sqrt{I_c}) \cdot \frac{2}{\pi}\sin(\pi\sqrt{I_m}) \cdot \frac{2}{\pi}\sin(\pi\sqrt{I_k(I_c, I_m, I_y)})$$

where
  M($I_n$) is moiré amplitude for the superposition of separations $I_n$; and
  c, m, y and k, respectively denote reference to cyan, magenta, yellow and black separations.

12. The method as described in claim 9, wherein said moiré amplitude is compared to a reference value selected to be less than the moiré amplitude maximum value.

13. The method as described in claim 12, wherein said moiré amplitude maximum value occurs when $I_c=I_m=I_k=¼$, $I_n$ is the input amplitude corresponding to separation n and c, m, y, and k, respectively, denote reference to cyan, magenta, yellow, and black or key separations.

14. The processing system as described in claim 12, where an area coverage AC is restricted to lie outside a range of Δ about the value of about ¼.

15. The processing systems as described in claim 14, where Δ represents a visible range of moiré.

16. In a calibrated printing system including black addition and undercolor removal, an for which, a calibration process generates a calibration table relating device independent colors to device dependent colors, a said calibration process including a method of mitigating three color moiré, including:
  receiving and printing a set of calibration image signals in plural separations including black, after black addition and undercolor removal;
  determining whether undesirable three color moiré is present in said printed calibration image signals;
  generating a moiré mitigation strategy, substituting cyan, magenta and yellow pixels for black pixels;
  storing said strategy as part of a calibration table generated for said calibrated printing systems.

17. In a calibrated printing using more than three printing colorants, preparing a document image for printing, said document image to be described by image signals in plural color and varying the images signals to control three color moiré, including:
  receiving the image signals in plural separations;
  calculating an approximation of moiré amplitude from the received image signals;
  comparing moiré amplitude with at least one reference value;
  for location where said comparing indicates an undesired image moiré artifact, adjusting a color pixel defined by said plural separations to limit three color moiré.

18. The method as described in claim 17, wherein said more than three separations include at least three dominant separations.

19. The method as described in claim 17, wherein said moiré amplitude approximation is calculated in accordance with the function:

$$M(I_n) \propto \prod_n \sin(\pi\sqrt{I_n})$$

where
  M($I_n$) is moiré amplitude for the superposition of separations $I_n$; and
  the input value $I_n$ for at least one separation is calculated from other separations.

20. The method as described in claim 17, wherein said moiré amplitude is compared to a reference value selected to be less than the moiré amplitude maximum value.

* * * * *